(12) United States Patent
Kent et al.

(10) Patent No.: US 10,551,073 B2
(45) Date of Patent: Feb. 4, 2020

(54) THERMOSTATIC ACTUATOR FOR RADIATOR VALVE AND ZONED HEATING SYSTEM COMPRISING SAME

(71) Applicant: Schneider Electric Controls UK Limited, Plymouth, Devon (GB)

(72) Inventors: John Maurice Kent, Lostwithiel (GB); David M. Beasley, Plymouth (GB); Matthew Dennis, Plymouth (GB)

(73) Assignee: Schneider Electric Controls UK Limited, Shropshire (GB)

( * ) Notice: Subject to any disclaimer, the term of this patent is extended or adjusted under 35 U.S.C. 154(b) by 171 days.

(21) Appl. No.: 15/457,544

(22) Filed: Mar. 13, 2017

(65) Prior Publication Data

US 2018/0259198 A1    Sep. 13, 2018

(51) Int. Cl.

| | |
|---|---|
| *F24D 19/10* | (2006.01) |
| *G05D 23/19* | (2006.01) |
| *F24D 3/02* | (2006.01) |
| *F24D 19/00* | (2006.01) |
| *F16K 31/00* | (2006.01) |
| *F16K 31/04* | (2006.01) |
| *F16K 31/53* | (2006.01) |

(52) U.S. Cl.
CPC ........ *F24D 19/1018* (2013.01); *F16K 31/002* (2013.01); *F16K 31/04* (2013.01); *F16K 31/53* (2013.01); *F24D 3/02* (2013.01); *F24D 19/008* (2013.01); *G05D 23/1925* (2013.01); *F24D 2220/0257* (2013.01)

(58) Field of Classification Search
USPC ......................................................... 237/8 A
See application file for complete search history.

(56) References Cited

U.S. PATENT DOCUMENTS

| | | | | |
|---|---|---|---|---|
| 4,089,461 | A | * 5/1978 | Gocke | F16K 1/52 236/100 |
| 7,195,178 | B2 | * 3/2007 | Frederiksen | F24F 5/0092 236/44 C |
| 8,690,072 | B2 | * 4/2014 | Peric | F01P 7/14 236/34.5 |

\* cited by examiner

*Primary Examiner* — Steven B McAllister
*Assistant Examiner* — John E Bargero
(74) *Attorney, Agent, or Firm* — Stinson LLP (57) ABSTRACT

A thermostatic actuator for a radiator valve includes a thermostat mechanism configured to passively open the valve when an environmental temperature is less than a set point and to close the valve when the temperature is greater than the set point. A set point adjustment mechanism draws power from a power supply to selectively drive unitary movement of the thermostat mechanism to adjust the set point. Multiple actuators are used in a zoned radiant heating system in which a controller is operatively connected to the set point adjustment mechanism of each actuator to selectively transmit a control signal to actuate the set point adjustment mechanism to drive unitary movement of the respective thermostat mechanism to adjust the respective set point.

13 Claims, 8 Drawing Sheets

THERMOSTATIC ACTUATOR FOR RADIATOR VALVE AND ZONED HEATING SYSTEM COMPRISING SAME

TECHNICAL FIELD

The present disclosure generally relates to a thermostatic actuator for a radiator valve and a zoned heating system comprising thermostatic actuators for a plurality of environmental zones; more specifically, the present disclosure relates to a thermostatic actuator comprising a passive thermostat mechanism and a remotely controllable set point adjustment mechanism for adjusting the set point temperature of the thermostat mechanism based on control signals from a controller of the zoned heating system.

BACKGROUND

Radiant heating systems include a heater that is thermally coupled to radiators in different zones of a building. In a conventional radiant heating system, radiators are positioned in rooms in a residential structure and are operatively coupled to one or more boilers. Hot water from the boiler is fed to the radiators to radiantly heat the respective rooms. In most heating systems, each radiator is operatively connected to a respective valve that can be opened and closed to control the flow of hot water into the radiator and thereby control the temperature of the room. In many modern systems, the radiator valves are controlled by thermostatic actuators that selectively open and close the valve based on the environmental temperature in the respective room.

Traditional thermostatic valves operate passively. A thermally responsive element, such as a bellows, a plug of wax, a metallic coil, etc., expands and contracts and drives movement of a pin to open and close the valve. No energy other than changes in environmental temperature is required to open and close the valve. However, because conventional thermostatic actuators are only passively responsive to changes in environmental temperature, they are not suitable for centralized system control.

To provide some degree of centralized control in a zoned radiant heating system, electronic thermostatic valve actuators can be used instead of passive thermostatic actuators. Unlike passive thermostatic actuators, electronic actuators use motorized drivers to selectively open and close the valve and thus must draw power from a power supply to maintain or adjust the temperature in a room. Although the set point temperature of an electronic actuator can be adjusted from a central control module, providing power requires either running wires from an external power supply to the actuator or including in the actuator an onboard power supply that must be recharged or replaced as it is drawn down.

SUMMARY

The present disclosure generally relates to a thermostatic actuator comprising a thermostat mechanism configured to selectively open and close a radiator valve to control the temperature of an environmental zone. The thermostat mechanism includes a thermally responsive material that expands in response to a temperature increase (to close the valve) and contracts in response to a temperature decrease (to open the valve). In addition to the thermostat mechanism, the actuator includes a set point adjustment mechanism configured to selectively adjust the set point temperature of the actuator. The set point adjustment mechanism includes a driver configured drive unitary movement of the thermostat mechanism to adjust the set point. Multiple thermostatic actuators can be used in a zoned heating system in which the set point adjustment mechanisms receive remotely transmitted control signals that direct the drivers to drive unitary movement of the thermostat mechanisms to adjust the set points of the actuators.

In one aspect, a thermostatic actuator for a radiator valve comprising a valve member moveable along a valve axis through a range of motion including an open position and a closed position comprises a base configured for supporting the actuator on the radiator valve. A thermostat mechanism is supported on the base for movement along the valve axis with respect to the base. The thermostat mechanism comprises a pin movable along the valve axis with respect to the base and operatively connected to the valve member to drive the valve member through the range of motion thereof. A thermally responsive element is operatively connected to the pin to drive movement of the pin along the valve axis in an opening direction in response to a decrease in temperature and to drive movement of the pin along the valve axis in a closing direction in response to an increase in temperature. A set point adjustment mechanism is configured to selectively adjust a set point temperature of the actuator. The set point adjustment mechanism comprises an input member movable in a first direction and a second direction by a driver. The input member is operatively connected to the thermostat mechanism to drive unitary movement of the thermostat mechanism in the closing direction with respect to the base when the input member is driven in the first direction to thereby reduce the set point temperature of the actuator and to drive unitary movement of the thermostatic valve assembly in the opening direction with respect to the base when the input member is driven in the second direction to thereby increase the set point temperature of the actuator.

In another aspect, a system for controlling a temperature of a plurality of environmental zones in a building comprises a thermostatic actuator for each of the environmental zones in the building. Each thermostatic actuator has a configurable set point and is configured to be operatively connected to a radiator valve of the respective environmental zone to selectively drive movement of a valve member along a valve axis to open and close the radiator valve to adjust a temperature of the respective environmental zone toward the respective set point. Each thermostatic actuator comprises a thermostat mechanism configured to be operatively connected to the valve member of the respective radiator valve to passively drive movement of the valve member along the respective valve axis in an opening direction when the temperature in the respective environmental zone is less than the respective set point and to passively drive movement of the valve member along the valve axis in a closing direction when the temperature in the respective environmental zone is greater than the respective set point. A set point adjustment mechanism includes a power supply and a driver configured to draw power from the power supply to selectively drive unitary movement of the respective thermostat mechanism along the valve axis to adjust the set point. A controller is configured to be operatively connected to the set point adjustment mechanism of each of the thermostatic actuators to selectively transmit a control signal to the respective driver configured to actuate the driver to drive unitary movement of the respective thermostat mechanism along the respective valve axis to adjust the respective set point.

Other aspects and features will be apparent hereinafter.

BRIEF DESCRIPTION OF THE DRAWINGS

Corresponding reference characters indicate corresponding parts throughout the drawings.

DETAILED DESCRIPTION

Figure 1:
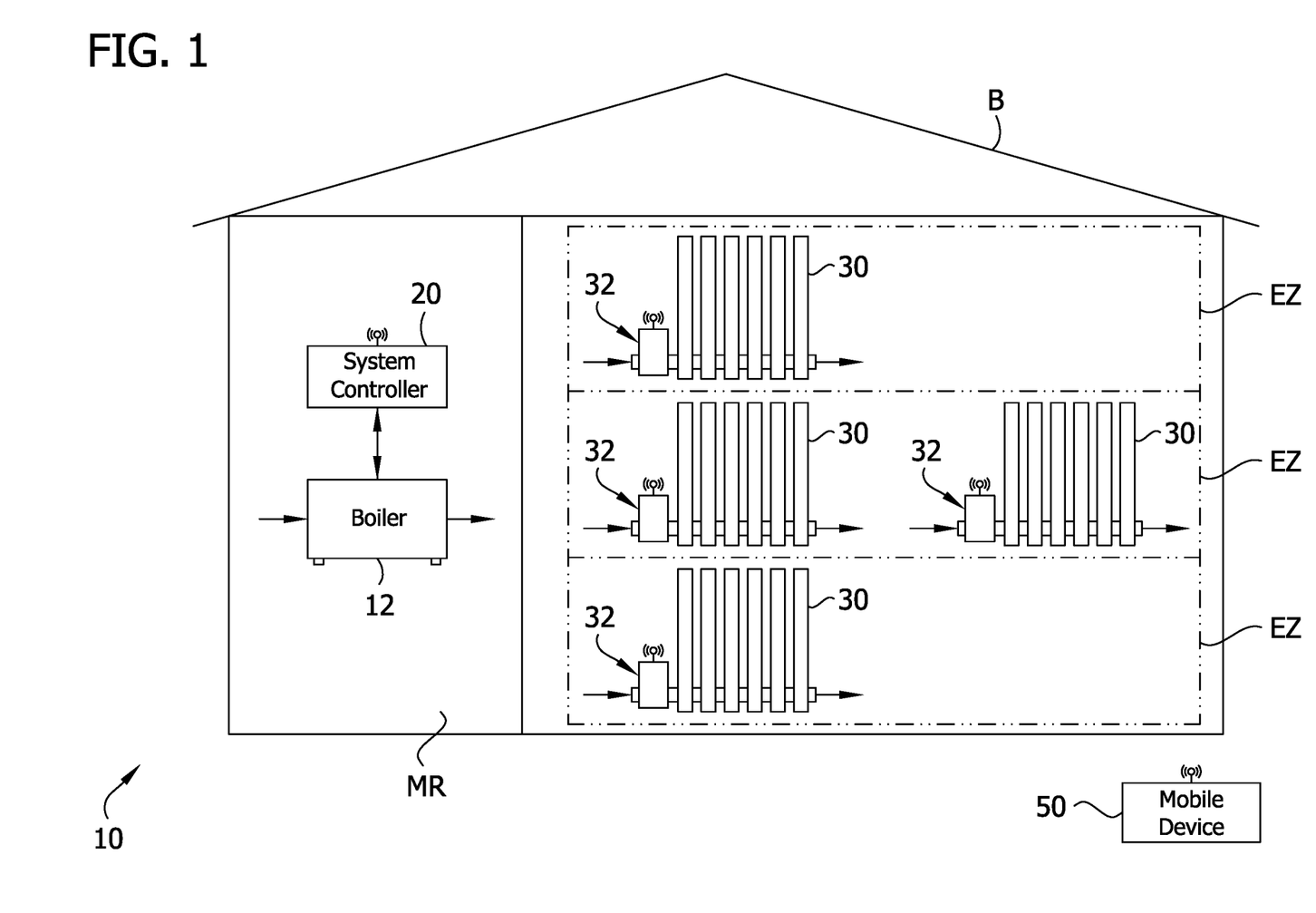
FIG. 1 is a schematic block diagram of a heating system.

Referring to FIG. 1, a zoned radiant heating system embodying aspects of the present disclosure is generally indicated at reference number 10. The radiant heating system 10 employs separate thermostatic actuators in each of a plurality of environmental zones EZ in a building B. As will be explained below, each thermostatic actuator has a configurable set point temperature and includes a passive thermostat mechanism that is configured to passively open the valve when the temperature in the environmental zone EZ is less than a set point and close the valve when the temperature in the environmental zone is greater than or equal to the set point. In addition, each thermostatic actuator includes a set point adjustment mechanism that is configured to selectively adjust the set point temperature of the actuator in response to a remote control signal provided by the radiant heating system 10. Before describing an exemplary thermostatic valve actuator in detail, the present disclosure provides a general overview of the radiant heating system 10.

The system 10 includes a boiler 12 that is fluidly connected to a water supply (not shown). In FIG. 1, the flow of water into and out of various components of the system 10, such as the boiler 12, is represented schematically by bold arrows. For clarity, FIG. 1 does not illustrate the interconnecting plumbing for the entire system. But one skilled in the art would readily understand how to interconnect the components of the system 10 through conventional plumbing techniques. The boiler 12 is configured to heat water and to supply hot water (broadly, a heating fluid) to various peripheral components of the system 10. The boiler 12 may be operatively connected to a controller 20 that is configured to control the boiler.

The radiant heating system 10 of FIG. 1 also includes one or more radiators 30 positioned in each environmental zone EZ for heating the respective environmental zone. In the illustrated embodiment, the building B includes three environmental zones EZ. One environmental zone EZ includes two radiators 30 and the other two environmental zones include one radiator each. It will be understood that the radiant heating system can be used with buildings having other numbers of environmental zones or other numbers of radiators in each zone without departing from the scope of the invention. The radiators 30 are selectively coupled to the boiler 12 to receive the hot water from the boiler. The radiators 30 are configured to convey radiant heat from the hot water to the respective environmental zones EZ.

Figure 2:
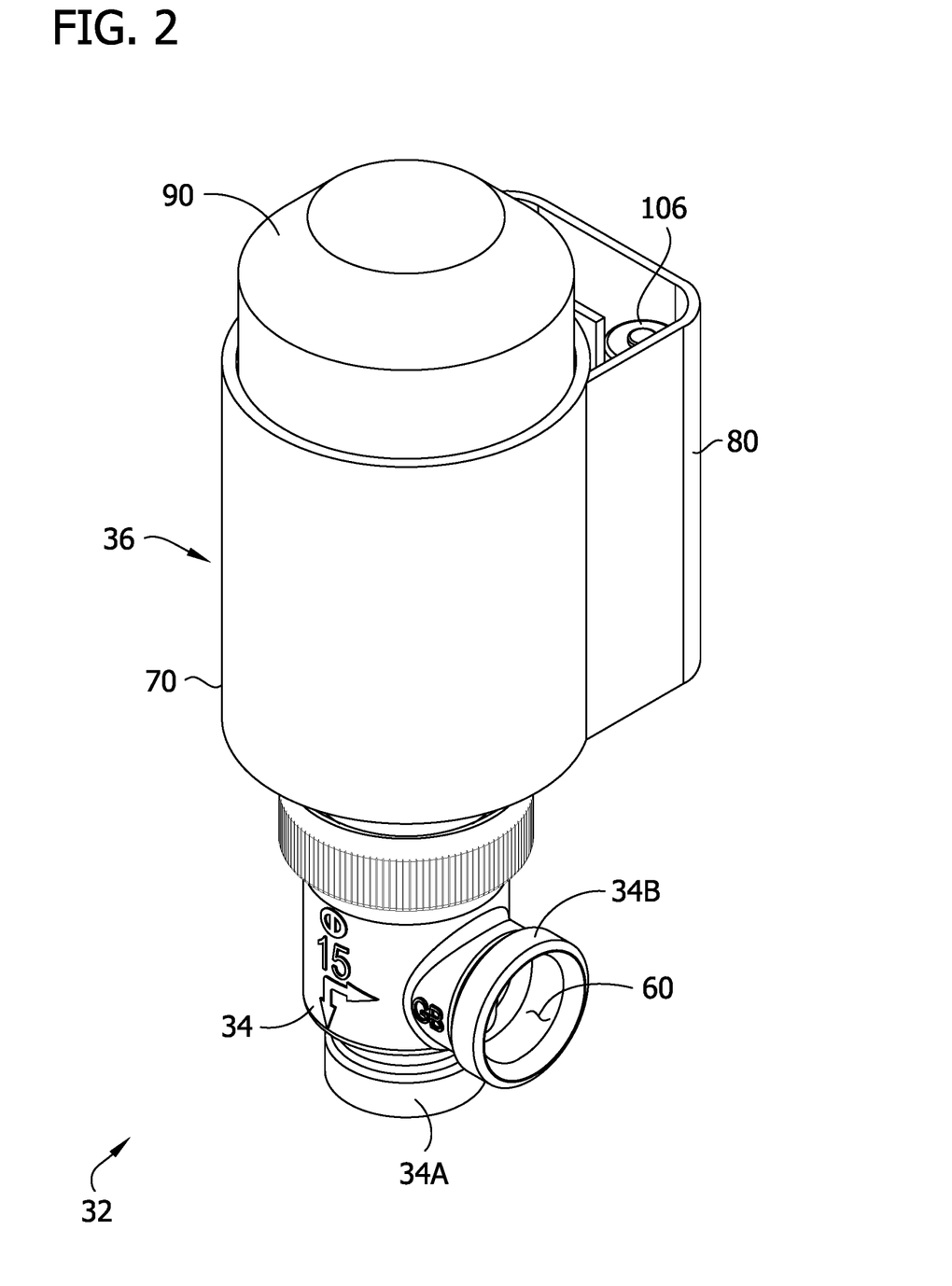
FIG. 2 is a perspective of a radiator valve of the heating system.

Each environmental zone EZ includes at least one radiator valve, generally indicated at 32, configured to selectively couple hot water from the boiler 12 to the radiator(s) 30 in the zone. In the illustrated embodiment, each radiator 30 has its own valve 32, but in other embodiments, a single valve can be used to control the flow of hot water to more than one radiator in a respective environmental zone EZ. Referring to an embodiment illustrated in FIGS. 2-3, each radiator valve 32 comprises a valve body 34 and a thermostatic actuator, generally indicated at 36, configured to open and close the valve body to selectively convey hot water from the boiler 12 through the valve body to the respective radiator 30. Each thermostatic actuator 36 has a configurable set point that defines the set point temperature of the respective radiator valve 32 and is configured to selectively open and close the valve based on differences between the temperature in the respective environmental zone EZ and the set point. Referring again to FIG. 1, each thermostatic actuator 36 is operatively connected to the controller 20 (e.g., using a wireless connection in the illustrated embodiment, though hardwired connections can also be used in other embodiments) to receive control signals from the controller. As explained below, the thermostatic actuators 36 are configured to adjust the set point temperature of the respective radiator valve 32 in response to the control signals.

In the illustrated embodiment of FIG. 1, the controller 20 is located in the mechanical room MR remote from at least some of the radiator valves 32 in the respective environmental zones EZ. To lower the cost of setting up the radiant heating system 10, in certain embodiments, a wireless communications protocol is used to establish a connection between the radiator valves 32 and the controller 20. Thus, in one or more embodiments, each thermostatic actuator 36 includes a wireless transceiver for exchanging signals with the controller 20. In a suitable embodiment, the transceiver communicates with the controller 20 using an RF connection, but other types of wireless connections (e.g., Wi-Fi, etc.) or a wired connection can also be used in other embodiments. The controller 20 is configured to transmit control signals to the valves 32 that are operative to adjust the operation of the valves to control the temperatures in the environmental zones. It is understood that, in some embodiments, the valves 32 are also configured to transmit signals to the controller 20 that are used to provide central control of the zoned climate control system 10.

In one or more embodiments, the controller 20 is operatively connected to a user input device 50 to receive user inputs for adjusting the set point temperature of the radiator valves 32. For example, in the illustrated embodiment, the central controller 20 is an internet connected device and the user input device 50 is a mobile device, such as a phone or a tablet, which communicates with the controller over an internet connection. In other embodiments, the central controller can include a local user interface mounted with the controller in the mechanical room MR or elsewhere in the building B. Suitably, the user input device 50 for the controller 20 includes an indicator (e.g., a display) configured to provide an indication to the user of the value of the set point temperature for each of the radiators 30 in the system 10. In addition, the user input device 50 is configured to receive user inputs selecting a new set point temperature for radiators 30. When the user input device 50 receives a user input selecting a new set point temperature, it transmits a user input signal to the controller 20. In response, the controller 20 transmits a set point adjustment control signal to the transceiver of the respective thermostatic actuator 36. The actuator 36 receives the set point adjustment control signal and adjusts the set point temperature of the thermostat 38 to the new user-selected set point temperature.

Referring to FIGS. 2-6, one exemplary embodiment of a radiator valve 32 will now be briefly described. As set forth above, the radiator valve 32 comprises a valve body 34. The valve body 34 defines a valve passage 60 that fluidly connects the hot water plumbing from the system boiler 12 to the respective radiator 30. The valve body 34 includes a first end fitting 34A and a second end fitting 34B. In the illustrated embodiment, radiator valve 32 is a reversible valve and thus either of the first and second end fittings 34A, 34B can be connected to the hot water plumbing to form the upstream end of the valve body 34 and the other of the end fittings can be connected to the respective radiator 30 to form the downstream end of the valve body. In either arrangement, when the valve 32 is open, hot water from the boiler 12 flows through the valve passage 60 from the upstream one of the end fittings 34A, 34B through the downstream one of the end fittings and into the radiator.

Figure 6:
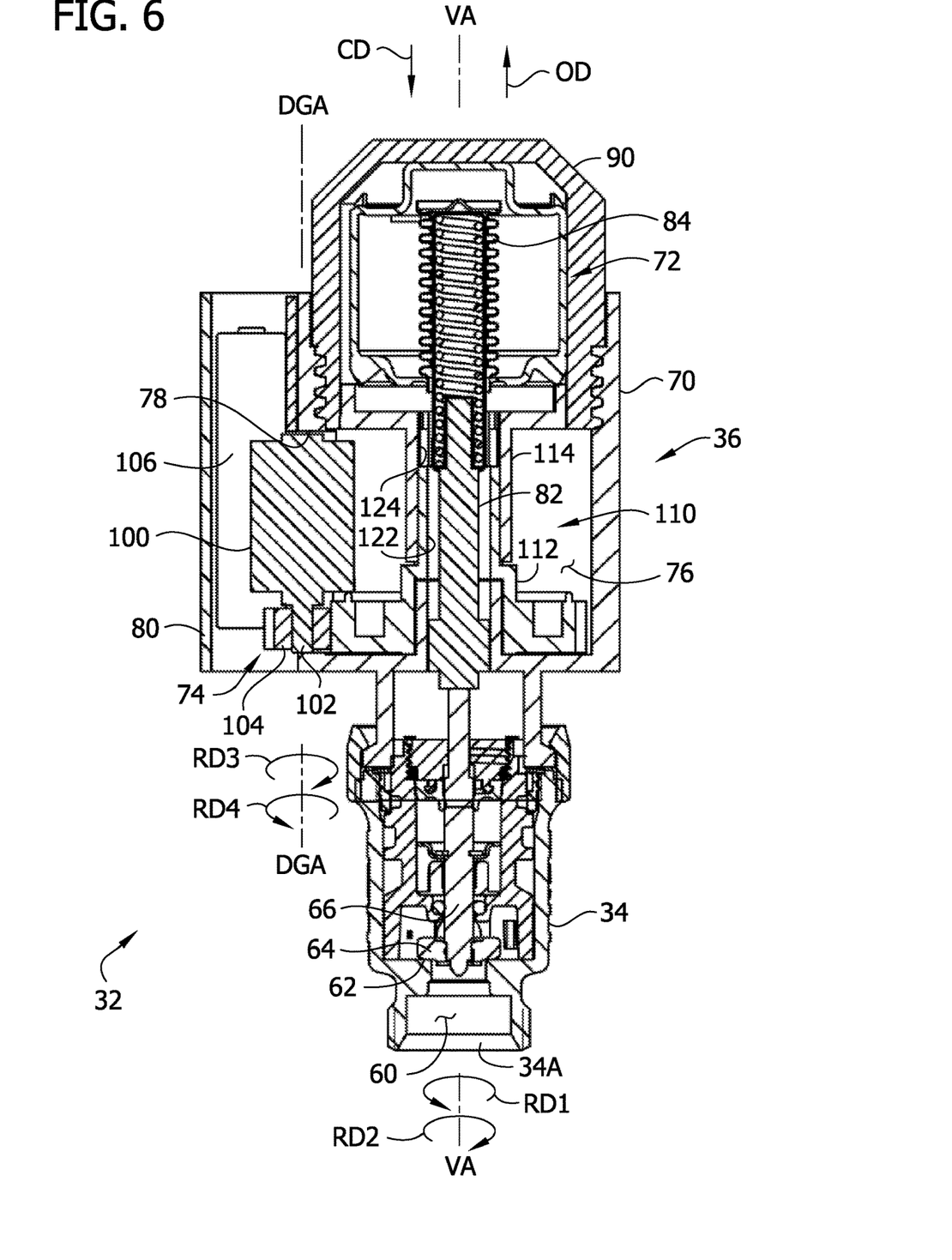
FIG. 6 is a cross section taken in the plane of line 6-6 of FIG. 4.

As shown in FIG. 6, the valve body 34 defines a valve seat 62 in the valve passage 60, and the valve 32 includes a disc 64 (broadly, a valve member) that is selectively engagable with the valve seat (as shown in FIG. 6) to close the valve. In the illustrated embodiment, disc 64 is attached to a stem 66. Stem 66 is spring loaded so that it is normally open. As described below, the valve stem 66 is configured to be operatively connected to the thermostatic actuator 36, which drives movement of the stem along a valve axis VA in an opening direction OD and a closing direction CD. The disc 64 moves conjointly with the stem 66 along the valve axis VA. When the disc 64 is driven in the opening direction OD, it travels away from the valve seat 62 to open the valve 32. When the disc 64 is driven in the closing direction CD, it travels toward the valve seat 62 to obstruct the flow passage 60 and close the valve 32.

Referring again to FIGS. 2-6, the thermostatic actuator 36 comprises a base 70 that supports a thermostat mechanism, generally indicated at 72, and a set point adjustment mechanism, generally indicated at 74. In the illustrated embodiment, the base 70 is a substantially enclosed housing that is mounted on the valve body 34 and defines a chamber 76 for receiving the thermostat mechanism 72 therein. The illustrated housing 70 has a side wall that extends generally along the valve axis VA and defines an opening 78 (FIG. 5) for receiving the set point adjustment mechanism 74. A cover 80 is mounted on the side wall of the housing 70 over the opening 78 to enclose the set point adjustment mechanism 74 supported on the housing. The cover 80 functions also to secure the batteries in position.

Figure 5:
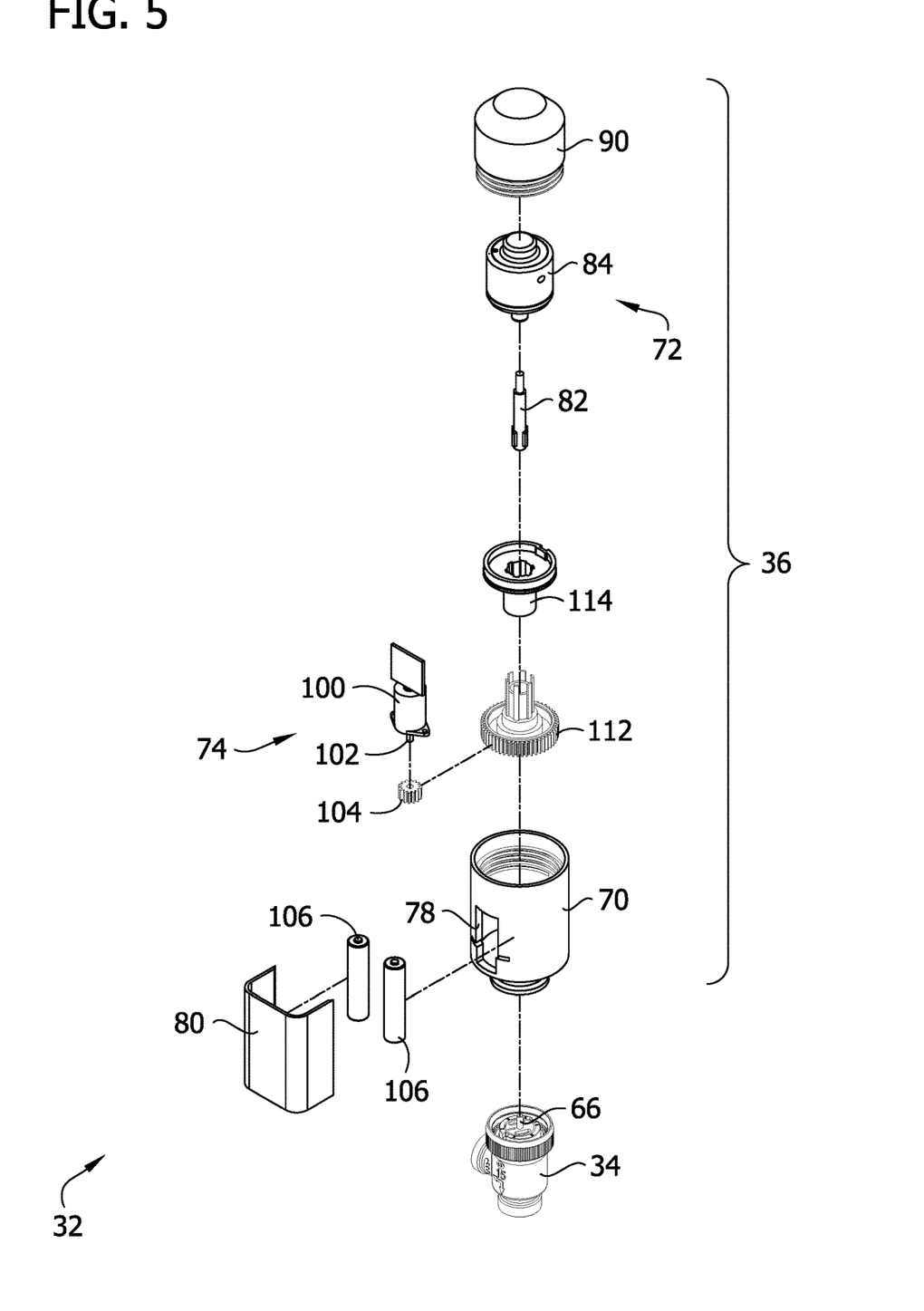
FIG. 5 is an exploded perspective of the radiator valve.

In one or more embodiments, the thermostat mechanism 72 is configured to passively drive movement of the valve stem 66 along the valve axis VA in response to differences between the temperature of the respective environmental zone EZ and the set point temperature of the radiator valve 32. As shown in FIGS. 5-6, the thermostat mechanism 72 includes a pin 82 that is movable along the valve axis with respect to the housing 70. The pin 82 is attached to the valve stem 66 so that the valve stem moves with the pin along the valve axis VA. Thus, when the pin 82 moves in the opening direction OD, the valve stem 66 and the disc 64 move in the opening direction to open the valve 32. When the pin 82 moves in the closing direction CD, the valve stem 66 and the disc 64 move in the closing direction to close the valve 32. The thermostat mechanism 72 further comprises a thermally responsive bellows 84 that expands and contracts in response to changes in environmental temperature. The bellows 84 is operatively connected to the pin 82 to drive movement of the pin along the valve axis VA when the bellows expands and contracts. Specifically, decreases in environmental temperature cause the bellows 84 to contract, which causes the pin 82 to move along the valve axis VA in the opening direction OD with respect to the housing 70. Increases in environmental temperature cause the bellows 84 to expand, which causes the pin 82 to move along the valve axis VA in the closing direction CD. Expansion and contraction of the bellows 84 is driven entirely by changes in the thermal environment; the bellows does not require power in order to expand and contract. In this sense, the bellows 84 is a "passive" thermally responsive element that expands and contracts passively—without drawing power—in response to changes in environmental temperature. Other passive thermally responsive elements, such as wax motors, thermally responsive coils, thermally responsive fluids, etc. can be used instead of the bellows 84 in other embodiments.

Figure 3:
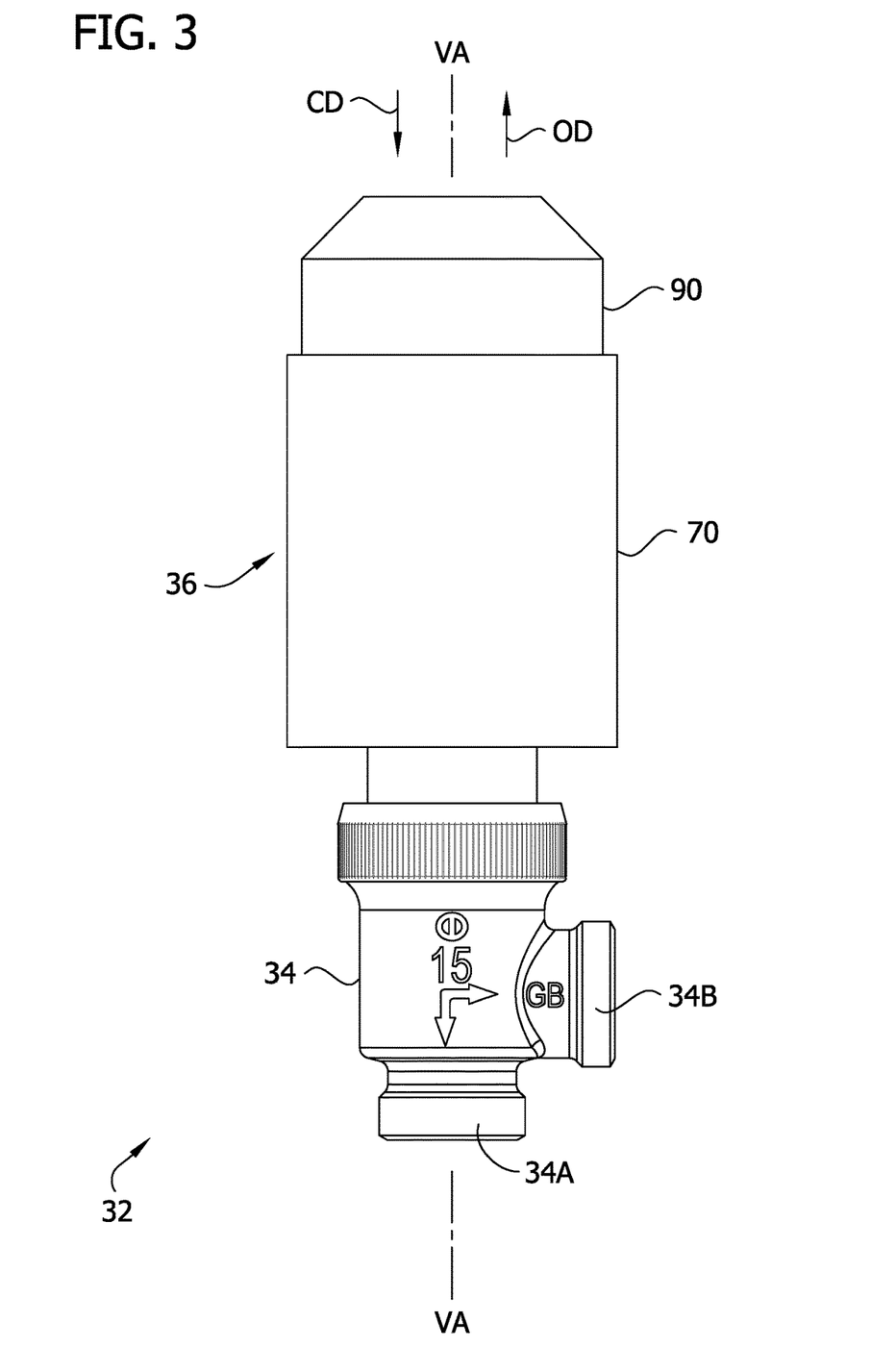
FIG. 3 is a side elevation of the radiator valve.
Figure 4:
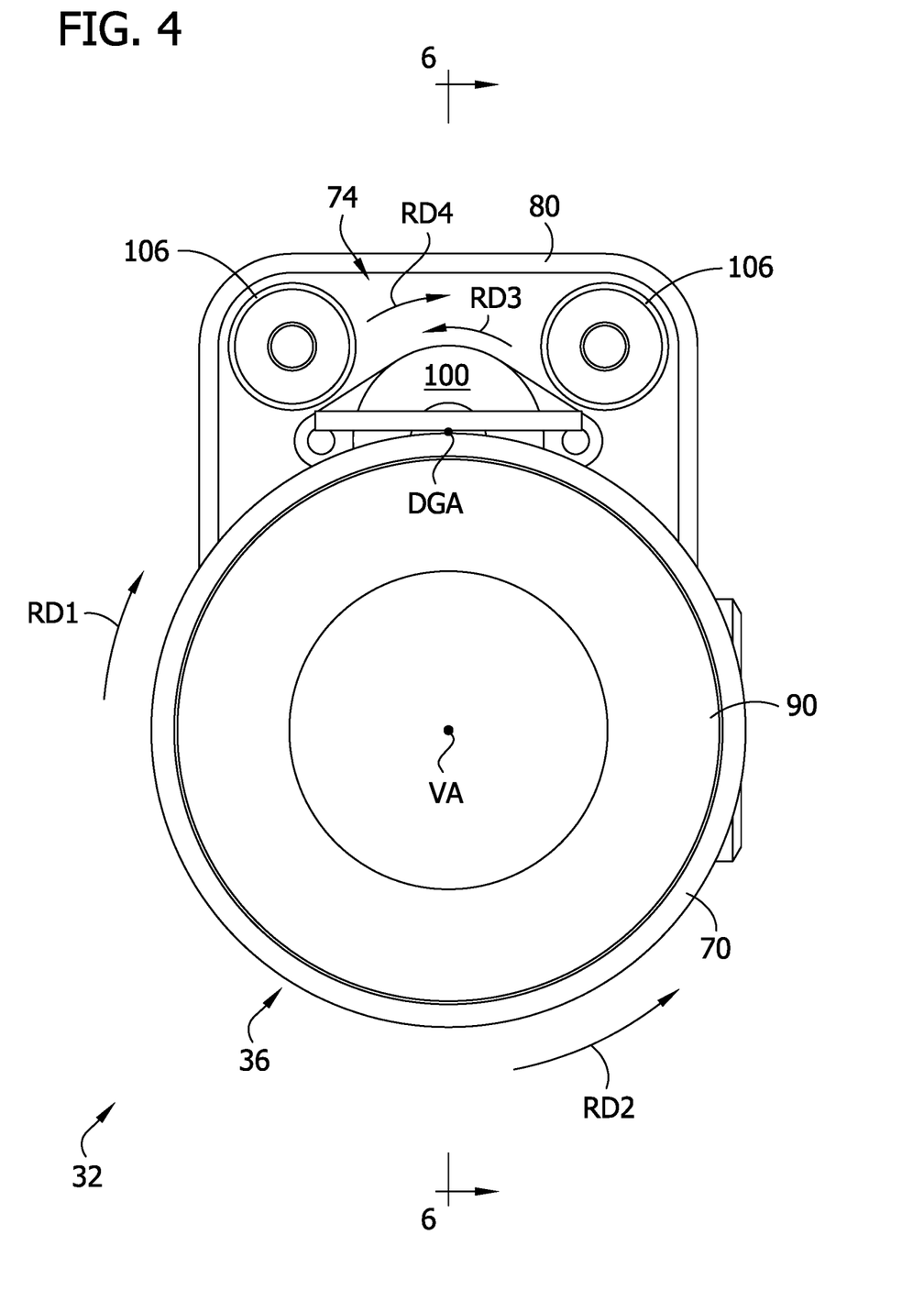
FIG. 4 is a top plan view of the radiator valve.

The thermostat mechanism 72 is supported on the housing 70 for unitary movement along the valve axis VA with respect to the housing. In this disclosure, "unitary" movement of the thermostat mechanism 72 refers to movement of both the pin 82 and the bellows 84 together along the valve axis VA (e.g., conjoint movement of the pin and bellows along the valve axis VA). The radiator valve 32 comprises a support cap 90 for supporting the thermostat mechanism 72. The support cap 90 is threadably engaged with the housing 70 for movement along the valve axis VA in response to rotation of the support cap about the valve axis with respect to the housing. Referring to FIGS. 3, 4, and 6, when the support cap 90 is rotated in a first direction RD1 with respect to the housing 70, it moves along the valve axis VA with respect to the housing in the closing direction CD. When the support cap 90 is rotated in a second direction RD2 with respect to the housing 70, it moves along the valve axis VA with respect the housing in the opening direction OD. The thermostat mechanism 72 is mounted on the support cap 90 for unitary movement along the valve axis VA with the support cap with respect to the housing 70. Thus, when the support cap 90 is rotated in the first direction RD1, it drives unitary movement of the thermostat mechanism 72 in the closing direction CD with respect to the housing 70. When the support cap 90 is rotated in the second direction RD2, it drives unitary movement of the thermostat mechanism 72 in the opening direction OD with respect to the housing 70. It is understood that one or more components of the thermostat mechanism 72 can move with the support cap 90 along the valve axis VA while the support cap simultaneously rotates relative to the one or more components about the valve axis. When changes in temperature cause expansion and contraction of the bellows 84, the pin 82 moves relative to the support cap 90 along the valve axis VA in the opening and closing directions OD, CD.

Referring to FIG. 6, unitary movement of the thermostat mechanism 72 along the valve axis VA with respect to the housing 70 adjusts the location at which the thermostat mechanism positions the disc 64 at a given environmental temperature (i.e., based on the configuration of the thermally responsive bellows 84 at the given temperature) and thereby adjusts the set point temperature of the radiator valve 32. If the support cap 90 is rotated in the first direction RD1 with respect to the housing 70, the support cap drives unitary movement of the thermostat mechanism 72 in the closing direction CD, which in turn drives movement of the valve stem 66 and the disc 64 in the closing direction relative to the valve seat 62. If prior to rotating the support cap 90 in the first direction RD1 the disc 64 was spaced apart from the valve seat 62 by a first distance at a given environmental temperature, after rotating the support cap in the first direction the disc would be spaced apart from the seat by a lesser distance at the same environmental temperature. Thus, less expansion of the bellows 84 (i.e., a lower environmental temperature) is required to engage the disc 64 with the seat 62 to close the valve 32, and the set point temperature of valve is reduced. Similarly, if the support cap 90 is rotated in the second direction RD2 with respect to the housing 70, the support cap drives unitary movement of the thermostat mechanism 72 in the opening direction OD, which in turn drives movement of the valve stem 66 and the disc 64 in the opening direction relative to the valve seat 62. If before rotating the support cap 90 in the second direction RD2 the disc 64 was spaced apart from the valve seat 62 by a first distance at a given environmental temperature, after rotating the support cap in the second direction the disc would be spaced apart from the seat by a greater distance at the same environmental temperature. Thus, more expansion of the bellows 84 (i.e., a higher environmental temperature) is required to engage the disc 64 with the seat 62 to close the valve 32, and the set point temperature of valve is increased.

The set point adjustment mechanism 74 is configured to selectively adjust the set point temperature of the actuator 36 driving unitary movement of the thermostat mechanism 72 along the valve axis VA. Specifically, the set point adjustment mechanism 74 is configured to selectively rotate the support cap 90 about the valve axis VA to adjust the set point temperature of the actuator 36 as described above. In the illustrated embodiment, the set point adjustment mechanism 74 is configured to adjust the set point temperature in response to receiving a set point adjustment signal from the controller 12, but the set point adjustment mechanism could be actuated in other ways in other embodiments.

Referring further to FIGS. 4-6, the set point adjustment mechanism 74 comprises a motor 100 (broadly, a driver) supported on the housing 70 for selectively driving unitary movement of the thermostat mechanism 72 along the valve axis VA. The motor 100 comprises a shaft 102 and a drive gear 104 (broadly, an input member) pressed onto the shaft. In the illustrated embodiment, the motor 100 is operatively connected to batteries 106 to draw power from the batteries to rotate the shaft 102 and the drive gear 104 about a drive gear axis DGA oriented substantially parallel to the valve axis VA. In other embodiments, the motor could be configured to draw power from another power source (e.g., an external power source, etc.). Likewise, in other embodiments, other types of drivers (e.g., linear drivers) can be used instead of an electric motor configured to rotate a drive gear about a drive gear axis.

In the illustrated embodiment, the batteries 106 are received in the interior of the cover 80 and the motor 100 and the drive gear 104 are received in the opening 78 of the housing 70. A portion of the drive gear 104 extends into the interior 76 of the housing 70 for being operatively connected to a drive linkage, generally indicated at 110, which is received therein. As explained in further detail below, the drive linkage 110 operatively connects the drive gear 104 to the support cap 90 so that rotation of the drive gear in a first rotational direction RD3 about the drive gear axis DGA rotates the support cap in the first rotational direction RD1 about the valve axis VA and rotation of the drive gear in a second rotational direction RD4 about the drive gear axis rotates the support cap in the second rotational direction RD2 about the valve axis. As explained above, rotation of the support cap 90 about the valve axis VA with respect to the housing 70 drives unitary movement of the thermostat mechanism 72 to adjust the set point. Thus, as explained below, the linkage 110 operatively connects the set point adjustment mechanism 74 to the thermostat mechanism 72 for selectively adjusting the set point temperature of the actuator assembly 36 by driving unitary movement of the thermostat mechanism along the valve axis VA.

Suitably, when stationary, the motor 100 is configured to impart a braking resistance on the thermostat mechanism 72 that resists unitary movement of the thermostat mechanism along the valve axis VA. In the illustrated embodiment, the motor 100 comprises a stepper motor, which has an inherently high resistance to rotation when stationary. Thus, the motor 100 imparts a braking resistance on the drive gear 104 that limits rotation of the drive gear 104 about the drive gear axis DGA when the motor is not drawing power from the batteries 106 to drive rotation of the drive gear. The linkage 110 conveys this braking resistance to the support cap 90 to limit rotation of the support cap with respect to the housing 70 about the valve axis. The support cap 90 in turn conveys the braking resistance to the thermostat mechanism 72. Thus, when the bellows 84 expands or contracts in response to changes in environmental temperature, the braking resistance imparted by the motor 100 limits unitary movement of the thermostat mechanism 72 and the expansion or contraction of the bellows instead drives movement of the pin 82 relative to the support cap 90 and the housing 70 along the valve axis VA to open and close the valve 32.

Figure 7:
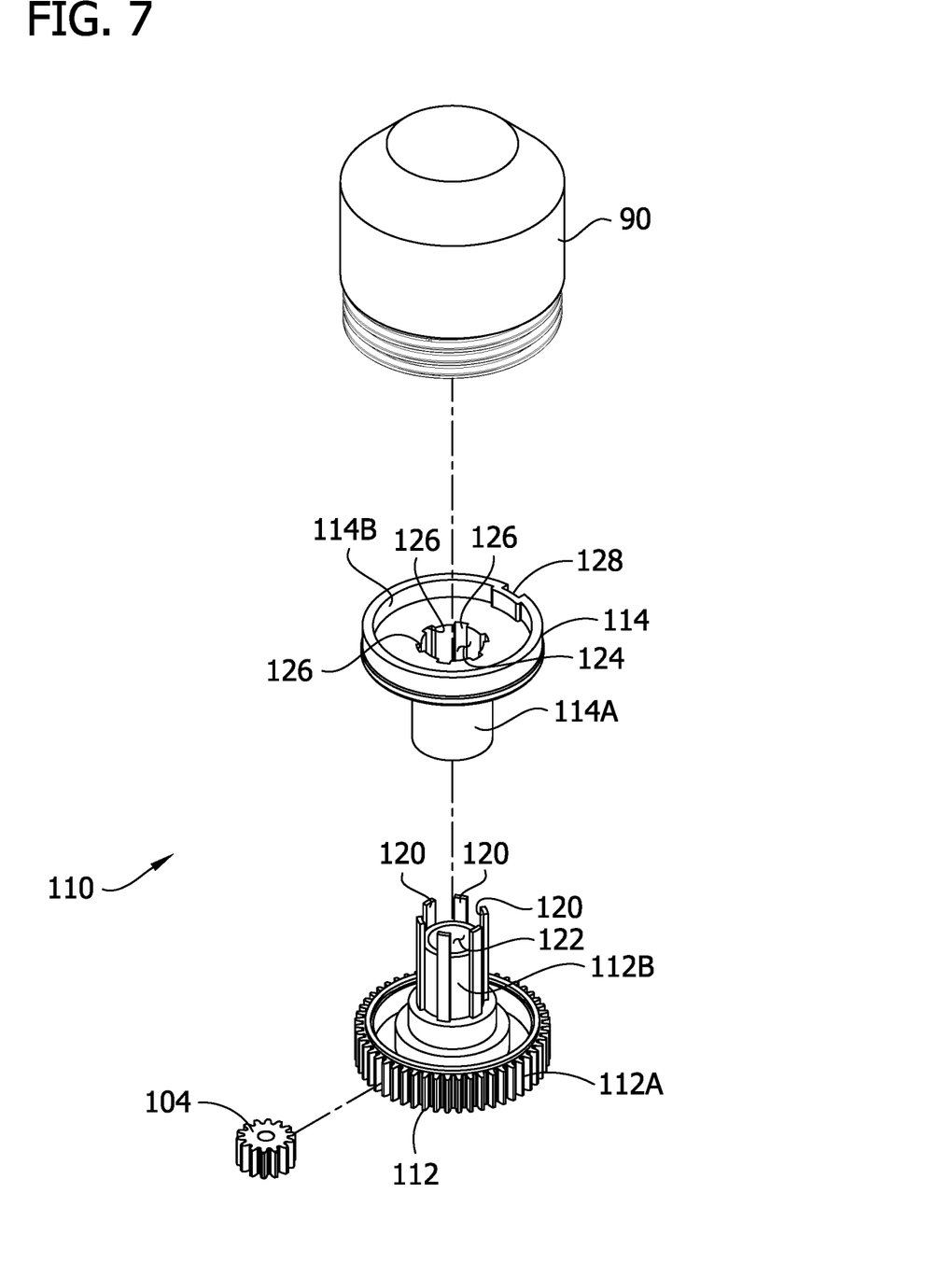
FIG. 7 is an enlarged exploded perspective of a subassembly of the radiator valve including a support cap, a driving gear, and a linkage that connects the support cap and the driving gear.
Figure 8:
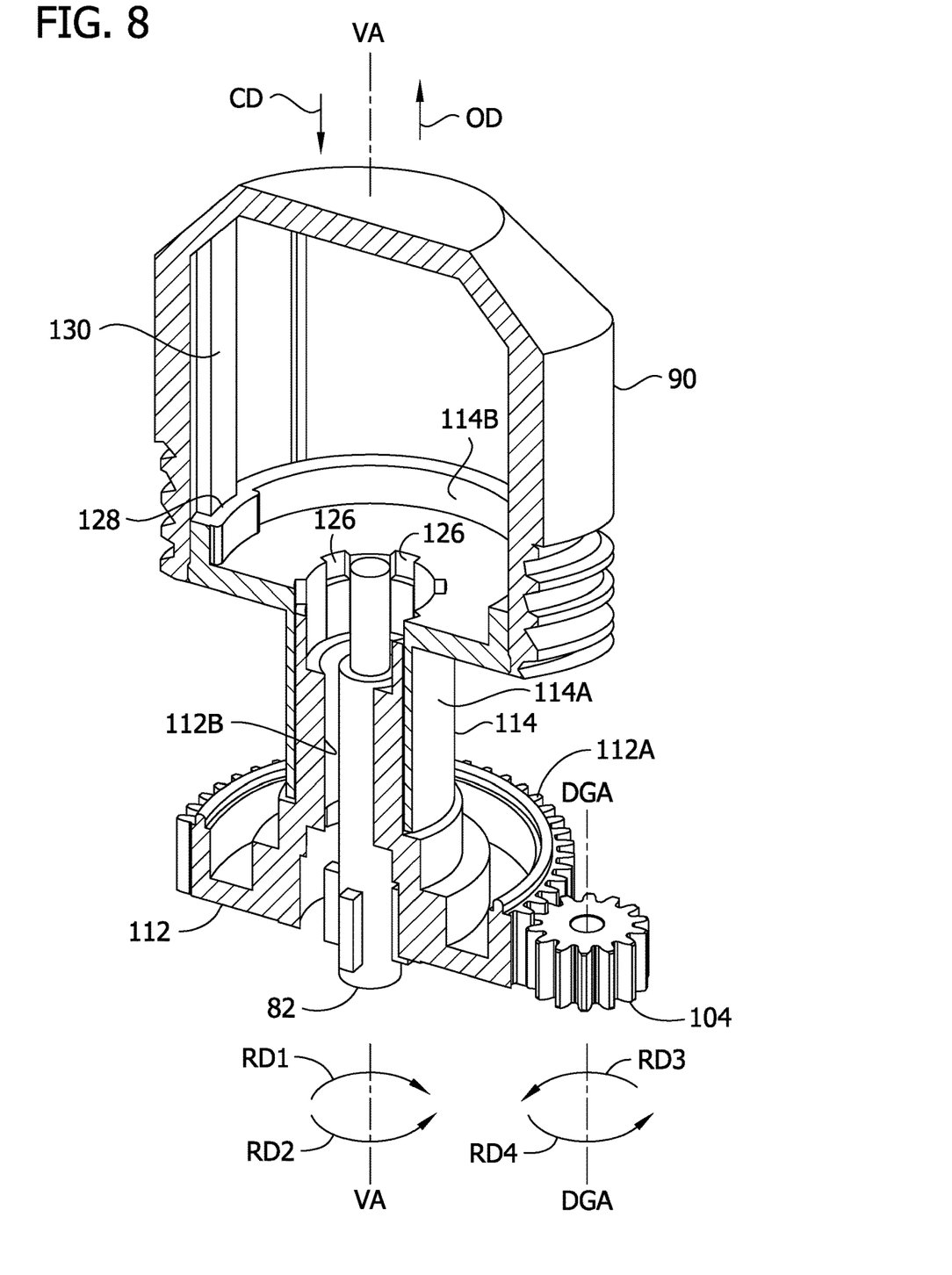
FIG. 8 is a perspective of the subassembly of FIG. 7 and a pin of the radiator valve shown in section.

Referring to FIGS. 7 and 8, the illustrated linkage 110 comprises a driven gear 112 meshed with the drive gear 104 and a coupling 114 operatively connecting the driven gear to the support cap 90. In the illustrated embodiment, the drive gear 112 is mounted on the housing 70 for rotation about a driven gear axis coincident with the valve axis VA. The driven gear 112 includes a spur gear portion 112A that includes teeth that are meshed with the teeth of the drive gear 104. Rotation of the drive gear 104 in the first direction RD3 about the drive gear axis DGA rotates the driven gear 112 in the first direction RD1 about the valve axis VA, and rotation of the drive gear in the second direction RD4 about the drive gear axis rotates the driven gear in the second direction RD2 about the valve axis. An annular connecting portion 112B projects from the spur gear portion 112A toward the support cap 90 along the valve axis VA. The connecting portion 112B includes a plurality of radially outwardly protruding elongate splines 120 spaced apart from one another circumferentially about the valve axis VA and extending generally along the valve axis VA. A passage 122 extends through the driven gear 112 along the valve axis for receiving a portion of the pin 82 of the thermostat mechanism 72.

The coupling 114 includes a gear connecting portion 114A and a support cap connecting portion 114B. The gear connecting portion 114A is generally cylindrical and includes an interior surface defining a passage 124 for receiving the connecting portion 112B of the driven gear 112 and a portion of the pin 82 of the thermostat mechanism 72 therein. The interior surface of the gear connecting portion 114A defines a plurality of elongate grooves 126 that are shaped and arranged for receiving the splines 120 of the driven gear 112 therein. When the splines 120 are received in the grooves 126, the coupling 114 is inhibited from rotating relative to the driven gear 112 about the valve axis VA. Thus, rotation of the driven gear 112 about the valve axis VA drives corresponding rotation of the coupling 114 about the valve axis. In the illustrated embodiment, the engagement between the splines 120 and the grooves 126 does not inhibit movement of the coupling 114 with respect to the driven gear 112 along the valve axis VA. Thus, while the coupling 114 is constrained to rotate with the driven gear 112 about the valve axis VA, the coupling is substantially free to move relative to the driven gear along the valve axis. It is understood that other types of connections that constrain a coupling to rotate with a driven gear and permit the coupling to move relative to the driven gear along the axis of rotation may also be used in other embodiments. For example, it is specifically contemplated that the coupling can comprise splines and the driven gear can comprise corresponding grooves and/or the gear connecting portion of the coupling can be matingly received within the passage of the connecting portion of the driven gear in other embodiments.

The coupling 114 is configured to connect the support cap 90 to the driven gear 114 to rotate together with the driven gear about the valve axis VA and to move relative to the driven gear along the valve axis. Suitably, the support cap 90 is attached to the coupling 114 to rotate together with the coupling about the valve axis VA. In the illustrated embodiment, the support cap connecting portion 114B of the coupling 114 includes a collar that defines a groove 128 extending generally along the valve axis VA. The support cap 90 defines a radially inwardly protruding spline 130 (FIG. 8) that extends generally along the valve axis VA and is shaped and arranged for being matingly received in the groove 128 of the coupling 114. When the spline 130 is received in the groove 128, the support cap 90 is inhibited from rotating relative to the coupling 114. Thus, the coupling 114 connects the driven gear 112 to the support cap 90 such that rotation of the driven gear about the valve axis VA drives corresponding rotation of the support cap. As described above, the support cap 90 is threadably engaged with the housing 70 so that rotation of the support cap 90 about the valve axis VA with respect to the housing drives movement of the support cap along the valve axis. In the illustrated embodiment, the coupling 114 is attached to the support cap 90 to travel with the support cap along the valve axis VA with respect to the housing 70 and the driven gear 112. But the splines 120 of the driven gear 112 remain mated with the grooves 126 of the coupling 114 as the coupling and the support cap 90 move relative to driven gear 112 along the valve axis VA. Thus, the coupling 114 rotates the support cap 90 about the valve axis VA in response to rotation of the driven gear 112 about the valve axis through the entire range of motion of the support cap. It is understood that the linkage could accommodate relative movement between the support cap and the driven gear along the valve axis in other ways in other embodiments (e.g., the support cap could be configured to move relative to the coupling along the valve axis as it is rotated with respect to the housing).

Referring again to FIG. 1, a method of using the radiator valves 32 to control the temperatures of the environmental zones EZ in the building B will now be briefly described. After the radiator valves 32 are connected between the radiators 30 and the boiler 12 and a communications connection is established between the thermostatic actuators 26 and the controller 20, a user can adjust the adjust the temperatures of the environmental zones EZ using the user input device 50. The user provides an input to the user input device 50 indicating the desired set point temperature for one or more of the environmental zones EZ, and the controller 20 conveys a set point adjustment signal to the thermostatic actuator(s) 36 of the radiator valve(s) 32 for the environmental zone(s). In response, the set point adjustment mechanism 74 automatically adjusts the set point temperature of the actuator 36 by driving unitary movement of the thermostat mechanism 72 along the valve axis VA.

For example, when the set point temperature is reduced, the motor 100 rotates the drive gear 104 about the drive gear axis DGA in the first direction RD3, which rotates the driven gear 112 about the valve axis VA in the first direction RD1. Rotation of the driven gear 112 drives corresponding rotation of the coupling 114 and the support cap 90 about the valve axis VA in the first direction RD1. The threaded engagement with the housing 70 causes the support cap 90 to travel along the valve axis VA in the closing direction CD relative to the housing, which drives unitary movement of the thermostat mechanism 72 along the valve axis in the closing direction. The thermostat mechanism 72 drives movement of the valve stem 66 and the disc 64 along the valve axis VA toward the valve seat 62 to reduce the set point temperature.

When the set point temperature is increased, the motor 100 rotates the drive gear 104 about the drive gear axis DGA in the second direction RD4, which rotates the driven gear 112 about the valve axis VA in the second direction RD2. Rotation of the driven gear 112 drives corresponding rotation of the coupling 114 and the support cap 90 about the valve axis VA in the second direction RD2. The threaded engagement with the housing 70 causes the support cap 90 to travel along the valve axis VA in the opening direction OD relative to the housing, which drives unitary movement of the thermostat mechanism 72 along the valve axis in the opening direction. The thermostat mechanism 72 drives movement of the valve stem 66 and the disc 64 along the valve axis VA away from the valve seat 62 to increase the set point temperature.

When the set point temperature is configured as desired, the bellows 84 passively expands when the environmental temperature is greater than the set point and passively contracts when the environmental temperature is less than the set point to drive movement of the pin 82 along the valve axis VA with respect to the support cap 90 and the housing 70, without drawing any power. The pin 82 drives movement of the valve stem 66 and the disc 64 in the opening and closing directions OD, CD with respect to the valve seat 62 to open and close the valve 32 and supply hot water to the radiator 30 as needed to maintain the set point temperature in the environmental zone. During expansion and contraction of the bellows 84, the support cap 90 is inhibited from moving relative to the housing 70 by the braking resistance imparted by the stepper motor 100.

As can be seen therefore, the thermostatic actuator 36 of the radiator valve 32 provides a mechanism for remotely adjusting the set point temperature of a radiant heating zone EZ, and the mechanism only draws power during set point adjustments. When the set point is not changing, thermostatic control is powered passively, by changes in environmental temperature. As compared with electronic thermostatic radiator valves, the radiator valves 32 draw less power, which requires less frequent battery charges or replacements.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A thermostatic actuator for a radiator valve comprising a valve member moveable along a valve axis through a range of motion including an open position and a closed position, the thermostatic actuator comprising:
    a base configured for supporting the actuator on the radiator valve;
    a thermostat mechanism supported on the base for movement along the valve axis with respect to the base, the thermostat mechanism comprising:
    a pin movable along the valve axis with respect to the base and operatively connected to the valve member to drive the valve member through the range of motion thereof, the pin; and
    a thermally responsive element operatively connected to the pin to drive movement of the pin along the valve axis in an opening direction in response to a decrease in temperature and to drive movement of the pin along the valve axis in a closing direction in response to an increase in temperature; and
    a set point adjustment mechanism configured to selectively adjust a set point temperature of the actuator, the set point adjustment mechanism comprising an input member movable in a first direction and a second direction by a driver, the input member being operatively connected to the thermostat mechanism to drive unitary movement of the thermostat mechanism in the closing direction with respect to the base when the input member is driven in the first direction to thereby reduce the set point temperature of the actuator and to drive unitary movement of the thermostatic valve assembly in the opening direction with respect to the base when the input member is driven in the second direction to thereby increase the set point temperature of the actuator;
    wherein the thermostat mechanism comprises a support threadably engaged with the base for movement along the valve axis in response to rotation of the support with respect to the base;
    wherein the thermostatic actuator further comprises a linkage operatively connecting the input member to the support to rotate the support with respect to the base in response to movement of the input member in the first and second directions;
    wherein the input member comprises a drive gear, the driver being configured to selectively drive the drive gear in rotation about a drive gear axis oriented parallel to the valve axis;
    wherein the linkage comprises a driven gear meshed with the drive gear for rotation about a driven gear axis in response to rotation of the drive gear;
    wherein the linkage further comprises a coupling connecting the support to the driven gear to rotate with the driven gear about the driven gear axis and to move relative to the driven gear along the driven gear axis;
    wherein the coupling includes one of a spline and a groove extending along the driven gear axis and the driven gear includes the other of the spline and the groove slidably engaged with said one of the spline and the groove.

2. The thermostatic actuator as set forth in claim 1 wherein the set point adjustment mechanism comprises the driver, the driver being supported by the base and configured to be operatively connected to a power supply to draw power from the power supply to selectively move the input member in the first direction and the second direction.

3. The thermostatic actuator as set forth in claim 2 wherein the driver is configured to impart a braking resistance upon the thermostat mechanism when the input member is stationary, the braking resistance inhibiting unitary movement of the thermostat mechanism with respect to the base in response to a change in temperature.

4. The thermostatic actuator as set forth in claim 2 wherein the driver comprises an electric motor.

5. The thermostatic actuator as set forth in claim 2 wherein the driver comprises a stepper motor.

6. The thermostatic actuator as set forth in claim 2 wherein the power supply comprises a battery mounted on the base.

7. The thermostatic actuator as set forth in claim 1 wherein each of the driven gear and the coupling defines a respective passage extending along the valve axis, the pin extending through said passages along the valve axis.

8. The thermostatic actuator as set forth in claim 1 wherein the driven gear axis is coincident with the valve axis.

9. The thermostatic actuator as set forth in claim 1 wherein the pin is movably connected to the support for movement with respect to the support along the valve axis.

10. The thermostatic actuator as set forth in claim 1 wherein the thermally responsive element comprises a bellows.

11. The thermostatic actuator as set forth in claim 1 in combination with the radiator valve.

12. A system for controlling a temperature of a plurality of environmental zones in a building, the system comprising:
    a thermostatic actuator for each of the environmental zones in the building, each thermostatic actuator having a configurable set point and being configured to be operatively connected to a radiator valve of the respective environmental zone to selectively drive movement of a valve member along a valve axis to open and close the radiator valve to adjust a temperature of the respective environmental zone toward the respective set point, each thermostatic actuator comprising:
    a base configured for supporting the actuator on the radiator valve;
    a thermostat mechanism supported on the base for movement along the valve axis with respect to the base, the thermostat mechanism comprising:
    a pin movable along the valve axis with respect to the base and operatively connected to the valve member to drive the valve member through the range of motion thereof, the pin; and
    a thermally responsive element operatively connected to the pin to drive movement of the pin along the valve axis in an opening direction in response to a decrease in temperature and to drive movement of the pin along the valve axis in a closing direction in response to an increase in temperature; and
    a set point adjustment mechanism configured to selectively adjust the respective set point temperature, the set point adjustment mechanism comprising an input member movable in a first direction and a second direction by a driver, the input member being operatively connected to the thermostat mechanism to drive unitary movement of the thermostat mechanism in the closing direction with respect to the base when the input member is driven in the first direction to thereby reduce the respective set point temperature and to drive unitary movement of the thermostatic valve assembly in the opening direction with respect to the base when the input member is driven in the second direction to thereby increase the respective set point temperature;

wherein the thermostat mechanism comprises a support threadably engaged with the base for movement along the valve axis in response to rotation of the support with respect to the base;

wherein the thermostatic actuator further comprises a linkage operatively connecting the input member to the support to rotate the support with respect to the base in response to movement of the input member in the first and second directions;

wherein the input member comprises a drive gear, the driver being configured to selectively drive the drive gear in rotation about a drive gear axis oriented parallel to the valve axis;

wherein the linkage comprises a driven gear meshed with the drive gear for rotation about a driven gear axis in response to rotation of the drive gear;

wherein the linkage further comprises a coupling connecting the support to the driven gear to rotate with the driven gear about the driven gear axis and to move relative to the driven gear along the driven gear axis;

wherein the coupling includes one of a spline and a groove extending along the driven gear axis and the driven gear includes the other of the spline and the groove slidably engaged with said one of the spline and the groove; and a controller configured to be operatively connected to the set point adjustment mechanism of each of the thermostatic actuators to selectively transmit a control signal to the respective driver configured to actuate the driver to drive unitary movement of the respective thermostat mechanism along the respective valve axis to adjust the respective set point.

13. The thermostatic actuator as set forth in claim 1 wherein the splines are configured to slide longitudinally in the grooves to guide movement of the coupling relative to the driven gear along the driven gear axis.

* * * * *